United States Patent [19]

Liles et al.

[11] Patent Number: 5,043,119

[45] Date of Patent: Aug. 27, 1991

[54] HIGH STRENGTH PARTICULATE CERAMICS

[75] Inventors: Kenneth J. Liles; Jesse L. Hoyer, both of Tuscaloosa, Ala.; Kenneth W. Mlynarski, Gambrills, Md.

[73] Assignee: The United States of America as represented by the Secretary of the Interior, Washington, D.C.

[21] Appl. No.: 367,646

[22] Filed: Jun. 12, 1989

[51] Int. Cl.$^5$ .............................................. C04B 35/10
[52] U.S. Cl. ..................................... 264/65; 264/125; 501/98
[58] Field of Search ..................... 264/65, 125; 501/98

[56] References Cited

U.S. PATENT DOCUMENTS

| | | | |
|---|---|---|---|
| 2,872,726 | 2/1959 | Goliber | 419/19 |
| 2,973,570 | 3/1961 | Nachtman | 419/19 |
| 2,982,014 | 5/1961 | Meyer-Hertwig | 419/35 |
| 3,108,887 | 10/1963 | Lenie et al. | 501/98 |
| 3,113,879 | 12/1963 | Foster et al. | 501/98 |
| 4,789,650 | 12/1988 | Friederich et al. | 501/98 |

*Primary Examiner*—James Derrington
*Attorney, Agent, or Firm*—E. Philip Koltos

[57] ABSTRACT

This invention relates to new and useful hard, dense, composite materials made from metallic nitrides such as titanium nitride when combined with aluminum oxide and aluminum nitride and a process comprising the steps of: (1) mixing constituent materials using kerosene as a mixing medium; (2) screening, settling, filtering, and washing the mixture in acetone; (3) filling and sealing said materials in a latex mold; (4) isostatically pressing the material into a compacted powder; and (5) sintering the compacted powder in a gas atmosphere at 1,850° C. for two hours.

3 Claims, No Drawings

HIGH STRENGTH PARTICULATE CERAMICS

The invention described herein may be manufactured and used by or for the Government of the United States of America for Governmental purposes without the payment of any royalties thereon or therefore.

BACKGROUND OF THE INVENTION

1. Field of the Invention

This invention relates to the field of ceramics and more particularly to the field of advanced ceramic composites for high temperature, pressure, and/or severe environment applications.

2. Description of the prior art

There has been an increasing interest in structural materials that can withstand severe conditions of temperature, pressure, and environment and can substitute for high-temperature alloys that require imported critical materials. The nonoxide ceramics (nitrides, carbides, borides, etc.) have high-technology applications because of their superior mechanical properties, hardness, and toughness.

According to the processes of manufacturing ceramic compounds hitherto known, the powders employed for the manufacture of ceramic bodies are dressed or prepared, then compressed by application of pressure or by use of a binder and finally sintered by a heat treatment. The compressed bodies are heated in furnaces, generally operated with electricity, until the required sintering temperature is reached; that is, the compressed bodies are subjected to external heat.

Advanced ceramic materials such as silicon carbide, silicon nitride, and SiAlON (silicon-alumina-oxynitride) have been considered for applications as materials which can replace metallic alloys requiring additions of chromium or other strategic metals to achieve required strengths.

Titanium based alloys have been proposed for use in certain elevated temperature applications where dimensional stability is important since they have moderately low density and good oxidation resistance and certain alloys have good properties at elevated temperatures. To increase the performance of jet aircraft, there is an ever present need to improve the strength and creep resistance of high temperature titanium alloys. Therefore, metallurgists have added increasing amounts of alloy elements (particularly aluminum) to titanium in order to increase the strength. However, when the aluminum content exceeds 6%, an ordered precipitate of $Ti_3Al$ is formed.

In U.S. Pat. No. 2,872,726 Goliber discusses hard refractory compositions produced by powder metallurgy from pulverulent mixtures of alumina and lower oxides or suboxides of titanium and from pulverulent mixtures of the aforesaid two ingredients and chromium. It is known that the lower oxides or suboxides of titanium, for example, those approximating titanium monoxide in composition, are hard substances. However, these materials by themselves lack strength and are much too brittle for practical use.

In U.S. Pat. No. 2,982,014, Meyer-Hartwig found that with mixed or metallic ceramics, the required increase in temperature can be obtained by employing powders reacting exothermically with each other. The use of exothermically reacting powders is particularly advantageous for the sintering process proper as the diffusion during the reaction results in a strong bonding between the metallic and non-metallic particles.

In other prior art, such as the U.S. Pat. No. 2,973,570 to Nachtman, the presence of substantial percentages of metal oxides, mixed metal oxides, inorganic compounds of metal oxides and other inorganic non-metallics have always been considered to be detrimental to the useful properties of the base metal or alloys containing such substances. It was found that structural materials possessing unusual and desirable properties may be produced by powder metallurgical processes from compositions of aluminum and aluminum alloy powders containing in finely divided form, oxides of those metals having high melting points and good solid solubility in aluminum where such oxides contain no non-metal other than oxygen.

SUMMARY OF THE INVENTION

The present invention resides in an improved process for synthesizing high strength particulate composites in the system titanium nitride-alumina-aluminum nitride. The principal utility of the instant invention is that it specifies compositions and methods of manufacture of a composite material which has high strength, fracture toughness and hardness, and can withstand high temperatures. The invention can be applied to those uses for which critical imported minerals are presently used such as high strength alloys that require important critical materials such as chrome and cobalt. The invention can also be used to meet the high performance demands required for structural materials in new and emerging technologies.

In work leading to the present invention, it was discovered that a hard, dense, composite material could be made from metallic nitrides such as titanium or zirconium when combined with aluminum oxide and aluminum nitride. Of these nitrides, titanium nitride showed the best results and was selected for further investigation.

EXAMPLE

The composites were made and tested using the following procedures. Commercially available titanium nitride, aluminum nitride, and aluminum oxide powders were used. Titanium nitride in the amounts of 20, 30, 40, 60, and 80 wt percent were used in the composites. The other constituents were varied in order to form the spinel. The components were mixed in a turbomill using kerosene as the mixing medium in order to prevent the reaction of aluminum nitride with water. The turbomill was operated at 1,500 r/min which resulted in a peripheral speed of 6.8 m/s. Aluminum balls, approximately 0.2 mm in diameter were added to prevent agglomeration of solids.

After mixing for 30 minutes, the material was screened to remove the aluminum balls, allowed to settle, filtered, and washed with acetone to remove residual kerosene. The filter cake was dried at 70° C. and the dried powder screened through 200 mesh. Briquettes measuring 1- by 2- by ⅜-in were preformed at 10,000 psi, encapsulated in a latex sheath, and isostatically pressed to 40,000 psi.

The pressed samples were fired at 1,850° C. for two hours under 5–15 psig of nitrogen in a graphite heating element furnace. The briquettes were ground to shape using 80, 200, and 325 grit diamond impregnated wheels. Shapes for test procedures were sliced with a diamond impregnated blade. Photomicrographs of the polished sample showed a titanium-rich particulate interspersed in a spinel matrix. The higher the starting percentage of titanium nitride, the greater the number of particulates. Further analysis showed the particulate to contain titanium, aluminum, oxygen, and nitrogen or, as a whole, TiAlON.

The composite material was tested against a commercial reaction sintered silicon nitride. No commercial materials of comparable composition are presently available for comparative purposes. Electrical conductivity of the composites can be made to vary from low to high by the amount of titanium nitride that is added to the starting materials.

Test results, shown in table 1, show that the TiAlON/Spinel composite has higher fracture toughness and, with one exception, higher modulus of rupture and Vickers' hardness than the reaction sintered silicon nitride.

TABLE 1

Summary of Test Results

| Starting materials | Hardness | MOR | Fracture toughness |
|---|---|---|---|
| wt pct TiN—Al$_2$O$_3$—AlN | DPH | MPa | MPa·$\sqrt{m}$ |
| 20-40-40 | 1,564 | 205 | 1.44 |
| 30-50-20 | 1,346 | 203 | 1.11 |
| 40-30-30 | 1,005 | 229 | 1.63 |
| 60-30-10 | 922 | 165 | 1.40 |
| 80-10-10 | 469 | 92 | .99 |

TABLE 1-continued

Summary of Test Results

| Starting materials | Hardness | MOR | Fracture toughness |
|---|---|---|---|
| Si$_3$N$_4$ | 741 | 130 | .61 |

Having thus described the invention so that other skilled in the art may be able to understand and practice the same, it is expressly understood that various changes within the skill of the art may be made in the inventive process and that materials and time-temperature-pressure conditions other than those specifically referenced herein may be employed in its practice without departing from the spirit and scope of the invention.

We claim:

1. A method of manufacturing a super-heat-resisting composite material consisting essentially of titanium nitride, aluminum oxide, and aluminum nitride, the method comprising the steps of:
   mixing said materials in a turbomill using kerosene as a mixing medium;
   screening, settling, filtering, and washing the resulting mixture with acetone to remove residual solution;
   preforming said materials in a hardened steel die;
   filling and sealing said materials in a latex mold;
   isostatically pressing the material in the latex mold into compacted powder; and
   sintering the compacted powder in a gas atmosphere at 1850° C. for two hours.

2. The method according to claim 1 wherein said isostatic pressing occurs at a compacting pressure of 40,000 psi.

3. The method according to claim 1 wherein said sintering occurs in a 5-15 psig nitrogen atmosphere.

* * * * *